United States Patent [19]

Ellis et al.

[11] Patent Number: 5,835,708

[45] Date of Patent: Nov. 10, 1998

[54] EXTENDED PROGRAMMING INTERFACE FOR STREAMS-BASED X.25

[75] Inventors: John Glyn Ellis; Mary Alice Vicknair Wise, both of Austin, Tex.

[73] Assignee: International Business Machines Corporation, Armonk, N.Y.

[21] Appl. No.: 414,551

[22] Filed: Mar. 31, 1995

[51] Int. Cl.[6] .................................................. G06F 13/00
[52] U.S. Cl. ................................ 395/200.01; 395/200.12
[58] Field of Search ........................ 395/200.01, 200.12, 395/200.16; 370/465, 467, 469, 471, 474, 522

[56] References Cited

U.S. PATENT DOCUMENTS

| | | | |
|---|---|---|---|
| 4,887,260 | 12/1989 | Carden et al. | 370/60 |
| 5,048,087 | 9/1991 | Tribovich et al. | |
| 5,265,239 | 11/1993 | Ardolino | |
| 5,303,042 | 4/1994 | Lewis et al. | |
| 5,365,524 | 11/1994 | Hiller et al. | |
| 5,392,402 | 2/1995 | Robrock, II | |
| 5,535,199 | 7/1996 | Amri et al. | 370/60 |
| 5,559,800 | 9/1996 | Mousseau | 370/85.13 |

OTHER PUBLICATIONS

Kris Jamsa, "Internet Programming", Chapter 7, pp. 154–179, 1995.

*Primary Examiner*—Meng-Ai T. An
*Assistant Examiner*—Xuong M. Chung-Trans
*Attorney, Agent, or Firm*—Richard A. Henkler; Andrew J. Dillon

[57] ABSTRACT

Accordingly, the preferred embodiment includes an improved computer-implemented method and apparatus for interfacing a STREAMS processing path of a local machine to a network communications protocol of a network having at least one remote machine connected thereon. The method includes the addition of information to the primitives defined for the NPI as well as the steps of examining the primitives received from an application and processing them according to their information. If the primitive is a bind primitive, the method determines if the primitive contains a TRANSPAC option. If the TRANSPAC option is set, the method stores this information in the NPI context or data structure. If the primitive contains a PVC option, the method sets a PVC option in the context. The method then builds an X.25 listen primitive and sends it to the network to establish a listen for a connection.

4 Claims, 3 Drawing Sheets

EXTENDED PROGRAMMING INTERFACE FOR STREAMS-BASED X.25

BACKGROUND OF THE INVENTION

1. Field of the Invention

The present invention relates to improvements in network interface specifications and, more particularly, but without limitation, to an enhanced STREAMS network provider interface.

2. Background Information and Description of the Related Art

The International Consultative Committee on Telegraph and Telephone (CCITT) produces a wide range of world telecommunication standards. One such standard, called X.25, specifies a communications protocol for use over long distance wide area networks (WANs). Specifically, X.25 provides a mechanism for data transfer between remote machines. Numerous machines may have subscriptions to an X.25 network via communication lines provided by the network. The X.25 network divides the bandwidth of each communication line into a number of multiplexed logical channels. A machine can use its logical channels to establish virtual connections with other machines on the X.25 network.

The X.25 network provides Switched Virtual Circuits (SVC) to establish connections over logical channels. A call request/accept handshake establishes a SVC connection between two machines. The logical channel remains dedicated to the SVC connection until either one of the two machines requests the network to remove or clear the connection. Once an SVC connection has been cleared, the logical channel associated with the cleared connection can be used again for another connection.

When an SVC connection is established, call/clear user data (CUD) and facilities (optional) can be exchanged between the two machines being connected. CUD is used to exchange data between the two machines. Facilities are used to negotiate certain network services or behaviors. Two examples of facilities are packet size and reverse charges.

Another form of connection over a logical channel is called a Permanent Virtual Circuit (PVC). This form of connection uses a specific logical channel number, assigned by the network, for connection to a specific logical channel on a specific remote machine. In one aspect, PVCs provide enhanced performance over SVCs because PVCs do not require a call accept/request handshake. However, because PVCs are permanent, the logical channels associated with them cannot be used for other connections.

In sum, a PVC provides the same facilities as an SVC, except that the end-to-end connection of a PVC is always present as long as both machines are running. In contrast, the X.25 network dynamically establishes an SVC on a logical channel, which exists until it is cleared by one of the connected machines. This leaves a logical channel free for use with other connections.

Once a PVC or SVC connection is established between two systems, data can be transferred between them. The X.25 standard offers a qualifier bit (qbit), whereby applications and programming interfaces use it to qualify the type of data being transferred. Specifically, the qbit allows the application or programming interface to indicate when its sending internal control data verses other user data.

There are various mechanisms by which protocol layers within a machine communicate with each other. One commonly used mechanism is STREAMS. STREAMS provides a flexible set of tools for developing UNIX system communication services. It defines a generic message-driven queuing interface and provides a framework and tools for implementing communication services, such as a networking protocol stack. STREAMS does not impose any specific network architecture, rather, it is simply a framework.

A STREAM is a common term in the computer art for a two way data transfer and processing path between a device driver in kernel space and a user process in user space. Various programming interfaces have been specified for the STREAMS environment. However, one common STREAMS communication interface is the Network Provider Interface (NPI) specification from UNIX International. NPI provides an agreed standard for communications interface within STREAMS by enabling a user to write applications using a standard set of primitives and parameters. NPI allows applications to be portable between operating systems and network protocols.

However, the generic nature of NPI leads to deficiencies in supporting X.25. Specifically, NPI does not allow use of X.25's PVCs or qbit during data transfer. NPI also assumes the presence of both receiving and transmitting machine's addresses even though some X.25 networks, such as TRANSPAC, do not allow this. NPI also does not allow for CUD and facilities. Accordingly, there is a great demand for an improved STREAMS program interface that overcomes these NPI deficiencies and allows full use of X.25 functionality.

SUMMARY

Accordingly, the preferred embodiment includes an improved computer-implemented method and apparatus for interfacing a STREAMS processing path of a local machine to a network communications protocol of a network having at least one remote machine connected thereon. The method includes the addition of information to the primitives defined for the NPI as well as the steps of examining the primitives received from an application and processing them according their information. If the primitive is a bind primitive, the method checks if the primitive contains a TRANSPAC option. If the TRANSPAC option is set, the method stores this information in the NPI context or data structure. If the primitive contains a PVC option, the method sets a PVC option in the context. The method then builds an X.25 listen primitive and sends it to the network to establish a listen for a connection.

If the primitive is a connect request, the method determines if facilities are present within the connect request. If facilities are present, the method builds an X.25 call request primitive having facilities. The method then checks for and adds any CUD present in the connect request primitive to the X.25 call request packet. The method finally checks to see if the TRANSPAC option is set in the context. If it is set, the method adjusts the addresses in the X.25 call request packet such that only the remote machine's address is present. The method then sends the X.25 call request primitive to the network to establish a connection from the local machine to the remote machine.

If the primitive is a data transfer request, the method checks to see if the qbit is set. If the qbit is set, the method builds an X.25 data packet with the qbit set, and sends the X.25 data packet to the network to be sent to the remote machine.

Therefore, it is an object of the present invention to provide a network interface protocol that allows use of X.25's PVCs and qbit during data transfer.

It is another object of the present invention to provide a network interface protocol that works with TRANSPAC networks.

It is a further object of the present invention to provide a network interface protocol that allows unique CUDs and facilities.

It is yet another object of the present invention to provide a network interface protocol that provides an improved STREAMS program interface that provides full use of X.25 functionality.

These and other object, advantages, and features will become even more evident in light of the following detailed description and drawings.

DETAILED DESCRIPTION OF THE PREFFERED EMBODIMENT

Figure 1:
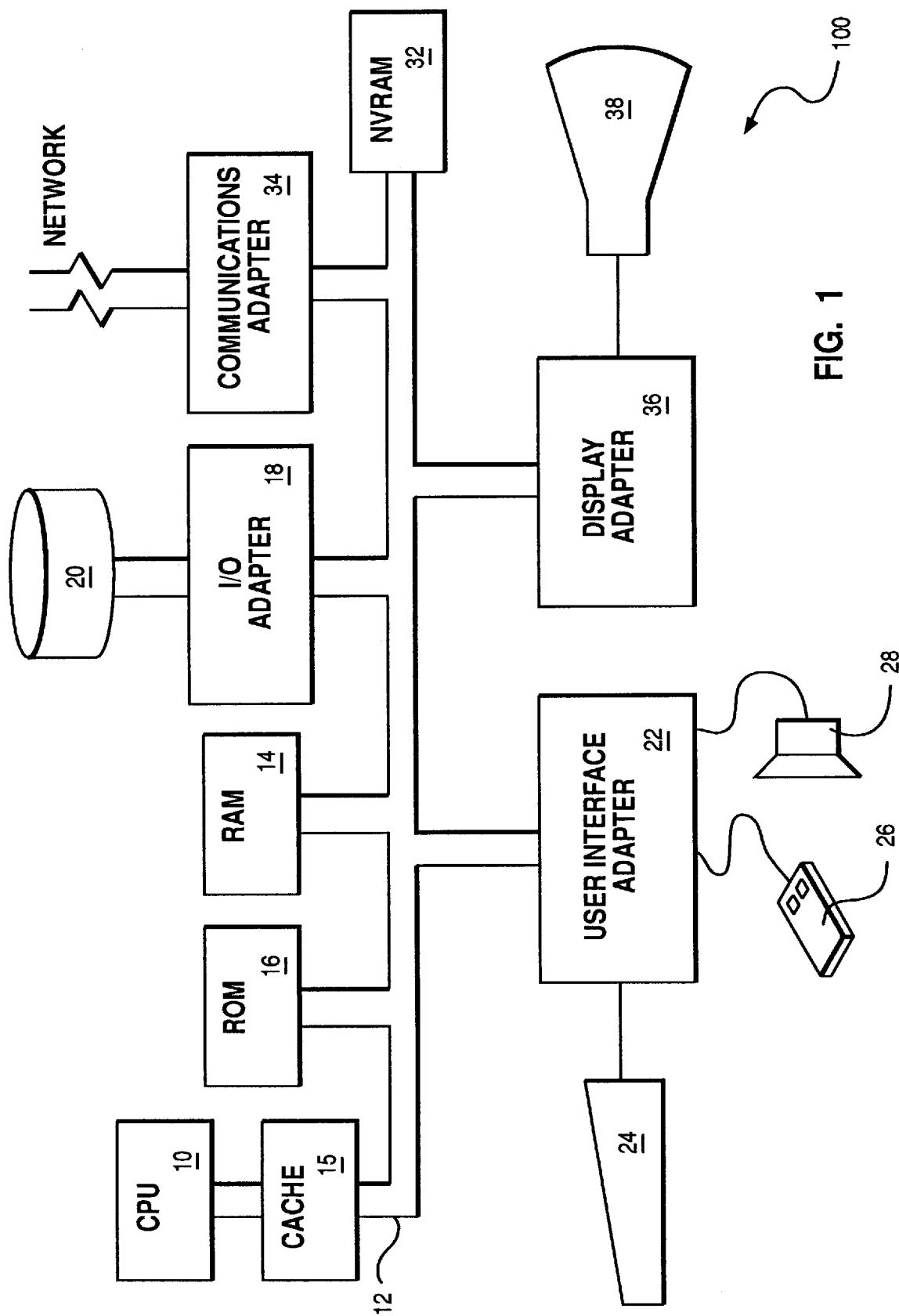
FIG. 1 illustrates a suitable representative hardware configuration in accordance with the present invention.

The preferred embodiment includes an improved STREAMS program interface for providing full use of X.25 functionality. The present invention is preferably practiced in a suitable representative hardware configuration, such as the hardware configuration illustrated in FIG. 1.

Workstation 100 includes any suitable central processing unit 10 (e.g. the first circuitry), such as a conventional microprocessor (e.g., Intel's Pentium™ or IBM's PowerPC™), and a number of other units interconnected via system bus 12. Illustratively, workstation 100 includes Random Access Memory (RAM) 14, Read Only Memory (ROM) 16, display adapter 36 for connecting system bus 12 to display device 38, and I/O adapter 18 for connecting peripheral devices (e.g. disk and tape drives 20) to system bus 12. Workstation 100 further includes user interface adapter 22 for connecting keyboard 24, mouse 26, speaker 28, microphone 32, and/or other user interface devices, such as a touch screen device (not shown), to system bus 12. In the preferred embodiment communication adapter 34 connects workstation 100 to a X.25 data processing network.

The preferred embodiment includes a STREAMS network interface (NI) residing within a machine-readable media (i.e., control element) to direct the operation of workstation 100. Any suitable machine-readable media may retain the network interface (NI), such as RAM 14, ROM 16, a CD-ROM, magnetic diskette, magnetic tape, or optical disk (the last four being located in disk and tape drives 20).

The NI contains data structures and detailed logic (described herein), that are transmitted as "signals" recognizable by workstation 100. Specifically, the NI is implemented within the AIX operating system, thereby producing an enhanced operating system. However, one skilled in the art readily recognizes that the NI could be implemented in other operating systems supporting STREAMS.

In the preferred embodiment, the NI controls CPU 10 (e.g. the first circuitry) to permit communication between workstation 100 and other workstations on the X.25 network. For ease in explanation, the following specification describes the NI as performing the various tasks of the present invention. In actuality, the NI merely controls and directs CPU 10 to perform those various tasks.

Figure 2:
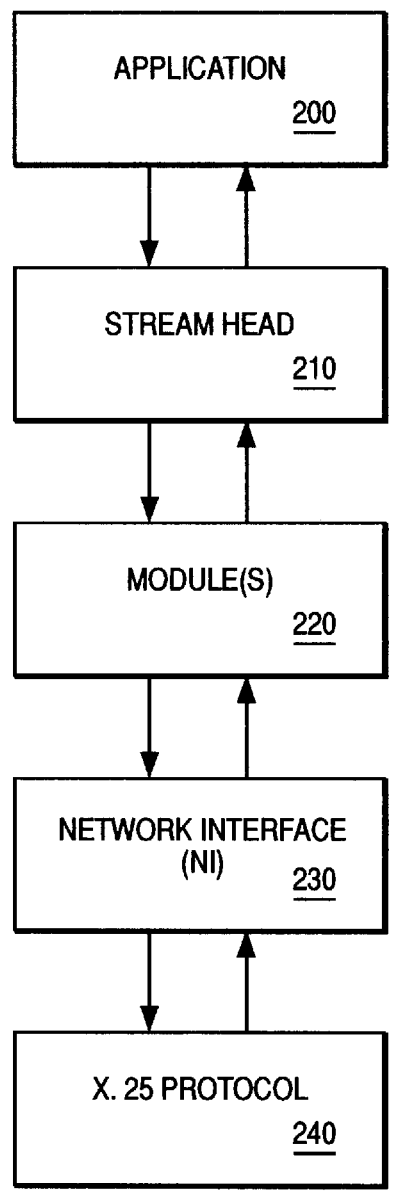
FIG. 2 illustrates a Stream in accordance with the preferred embodiment.

FIG. 2 illustrates a Stream in accordance with the preferred embodiment. The operating system constructs the Stream by linking several independent components, such as stream head 210, several modules (optional) 220, and NI module 230. Stream head 210 processes all STREAMS-related system calls made to the Stream and provides an interface between the Stream and user process 200.

Each component of the Stream includes two queues, one for transmitting STREAMS primitives downstream and one for transmitting STREAMS primitives upstream. STREAMS primitives are the communicating vehicle between components of the Stream. A STREAMS primitive contains data and/or other information originating from NI 230, module(s) 220, or stream head 210. Each queue contains status information and a put procedure, and may also contain a service routine. The put procedure and the service routine process STREAMS primitives. The STREAMS framework permits one or more modules 220 to be selectively pushed (i.e., inserted) or popped (i.e., removed) from the Stream.

Figure 3:
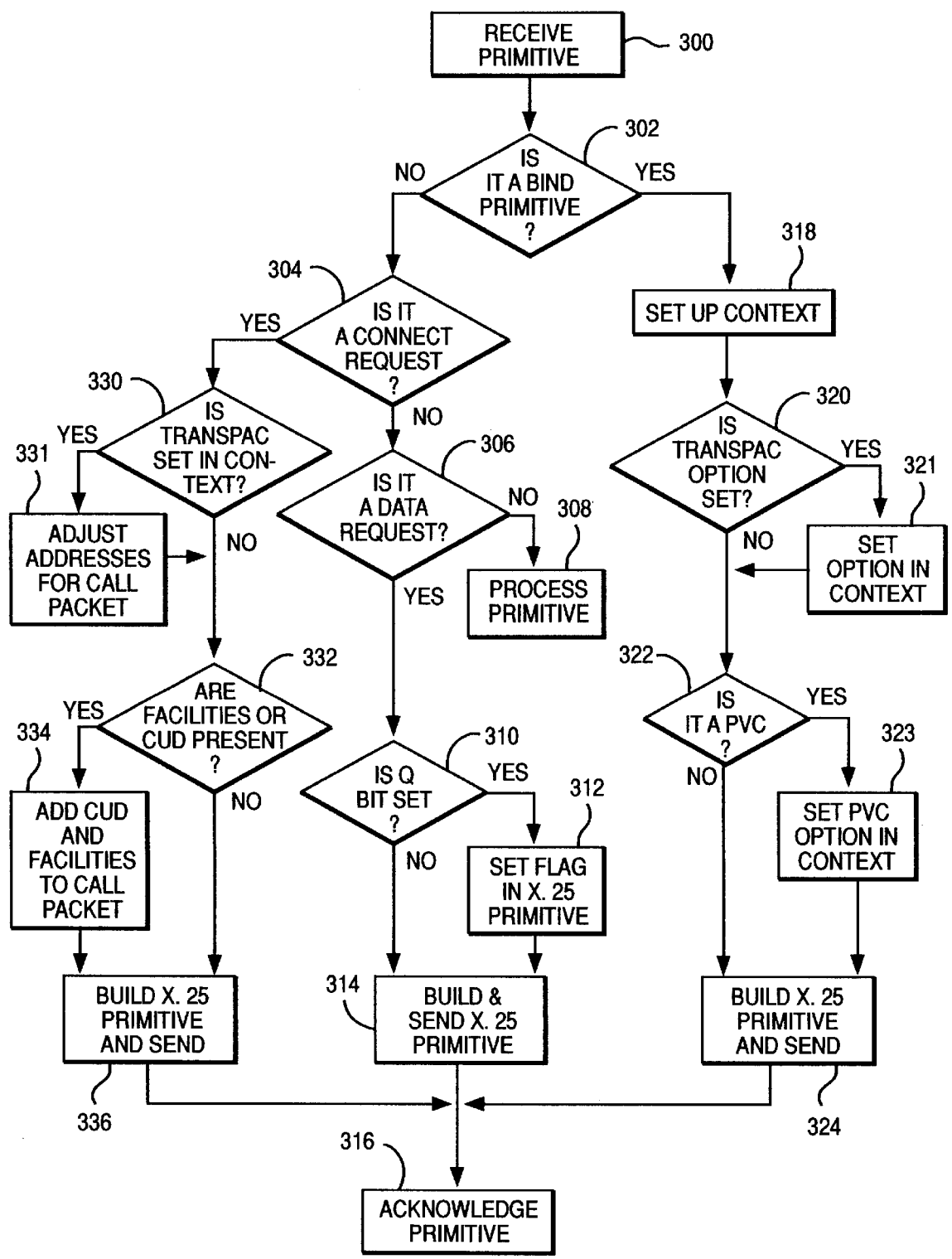
FIG. 3 illustrates a detailed logic of a STREAMS program interface having compatibility with an X.25 network.

FIG. 3 illustrates detailed logic of the STREAMS network interface having compatibility with an X.25 network. Referring to FIGS. 2 and 3, at 300, NI module 230 receives a primitive request from application 200 via stream head 210 and modules 220. At 302, NI 230 examines the primitive request to determine if it is an NPI bind primitive. An NPI bind primitive is a specific command requesting NI 230 bind or link an X.25 address of the local machine with the stream in FIG. 2. This primitive also builds a data structure within NI 230 containing information relating to the stream (described herein).

If the primitive is an NPI bind primitive, at 318, NI 230 builds a context (i.e., data structure) within the NPI. At 320, NI 230 examines a bit within the bind primitive to determine if a TRANSPAC option has been set by application 200. If so, at 321, NI 230 sets a field (i.e., bit) within the context indicating that the X.25 network is TRANSPAC. At 322, NI 230 examines a bit within the bind primitive to determine if the PVC option has been set by application 200. If set, at 323, NI 230 sets a bit in the context indicating that the connection type will be a PVC. At 324, NI 230 builds an X.25 primitive using the information from the bind request primitive and sends it to the network to prepare X.25 layers 240 for incoming connections.

Returning to 302, if the received primitive is not an NPI bind primitive, at 304, NI 230 determines if the primitive is an NPI connect request. Application 200 issues a connect request primitive when it desires to establish a connection to a remote machine on the X.25 network. If the primitive is a connect request, at 330, NI 230 determines if the TRANSPAC option was set by examining the context in NI 230. If set, at 331, NI 230 builds a call packet and adjusts the addresses in the call packet such that only the remote machine's address is present. At 332, NI 230 determines if there are any facilities or CUD present within the connect request primitive. These will be present if the application sends them in the connect request primitive. If so, at 334, NI 230 adds the CUD and facilities to the call packet. At 336, NI 230 builds an X.25 primitive from the connect request and sends it to the network to establish a connection between the local and remote machine.

Returning to 304, if the primitive is not an NPI connect request from application 200, at 306, NI 230 determines if the primitive is a data request from application 200. If not, at 308, NI 230 processes the received primitive accordingly. Otherwise, if a data request, at 310, NI 230 examines a bit within the primitive to determine if the qbit has been set. If set, at 312, NI 230 turns the qbit on in the X.25 primitive that it builds. If not, NI 230 simply builds an X.25 primitive using the data sent from the application 200. At 314, NI 230 sends the X.25 primitive to the network to send data to the remote machine. At 316, NI 230 returns an acknowledgement for the last primitive sent back to the application.

We claim:

1. A computer-implemented method for interfacing a STREAMS processing path of a local machine to a network communications protocol of a network having at least one remote machine connected thereon, comprising the steps of:

examining a primitive received from an application;

if the primitive is a connect request, determining if facilities are present within the connect request;

if the primitive is a bind primitive, determining if the bind primitive contains a TRANSPAC option;

if the bind primitive contains a TRANSPAC option, setting a TRANSPAC bit in a context;

if the bind primitive contains a PVC option setting a PVC bit in the context;

building a second X.25 Primitive from the bind Primitive and sending it to the network in order to bind to the stream; and if facilities are present, building an X.25 primitive having facilities.

2. The method according to claim 1 further comprising the step of:

sending the X.25 primitive to the network to establish a connection from the local machine to the remote machine.

3. The method according to claim 1 further comprising the step of:

if the primitive is a connect request, examining the context to determine if the TRANSPAC option is set;

if the TRANSPAC option is set, adjusting addresses in an X.25 call packet;

if the primitive contains facilities, adding the facilities to an X.25 call packet; and building an X.25 call request primitive from the connect request and sending the X.25 call request primitive to the network to establish a connection from the local machine to the remote machine.

4. The method according to claim 3 further comprising the step of:

if the primitive is a data request, examining the primitive to determine if the qbit is set;

if the qbit is set, setting a flag in an X.25 data primitive;

adding the data from the data request to the X.25 data primitive; and sending the X.25 data primitive to the network.

* * * * *